United States Patent [19]

David

[11] Patent Number: 4,558,971
[45] Date of Patent: Dec. 17, 1985

[54] CONTINUOUS PIPELINE FABRICATION METHOD

[76] Inventor: Constant V. David, 4952 Field St., San Diego, Calif. 92110

[21] Appl. No.: 586,831

[22] Filed: Mar. 6, 1984

[51] Int. Cl.$^4$ ............................................. F16L 1/04
[52] U.S. Cl. .................................. 405/158; 156/195; 156/175; 405/174; 405/156
[58] Field of Search ............... 405/158, 156, 166, 167, 405/184, 174; 29/429; 156/143, 195, 173, 175, 244.13

[56] References Cited

U.S. PATENT DOCUMENTS

| | | | |
|---|---|---|---|
| 2,605,202 | 7/1952 | Reynolds | 405/156 X |
| 2,723,705 | 11/1955 | Collins | 156/195 X |
| 3,130,104 | 4/1964 | Lewis et al. | 156/195 X |
| 3,740,958 | 6/1973 | Cadwell | 405/166 |
| 3,769,127 | 10/1973 | Goldsworthy et al. | 156/175 X |
| 3,855,031 | 12/1974 | McNeely et al. | 156/195 X |
| 4,341,580 | 7/1982 | Ahmed et al. | 156/195 X |
| 4,343,672 | 8/1982 | Kanao | 156/195 X |

Primary Examiner—Dennis L. Taylor

[57] ABSTRACT

A filament or tape winding machine equipped with an automatically retractable mandrel for constructing in place the wall of a pipeline in a continuous and uninterrupted manner. The winding and the building up of the pipeline wall progress at a velocity equal to that of the extraction of the mandrel from inside of the completed pipeline. The filament or tape reinforcing material is bonded in place with a resin system applied and cured at fabrication stations, during the pipeline manufacturing process, located where the mandrel is supporting the pipeline wall. This mandrel supporting function ceases at a point where the pipeline wall has enough strength to support itself. The reinforcement material winding mechanism, the mandrel extracting mechanism and the resin curing equipment are all mounted on a vehicle or train of vehicles propelled to move forward and leave in place behind the finished fabricated pipeline ready for use. The internal and external surfaces of the pipeline wall are made of materials suitable for the intended pipeline application and type of weather exposure anticipated. The incorporation of these materials in tape form is also performed by winding these tapes the same way and in a programmed manner. The pipeline fabricating machinery can also be mounted aboard a ship to lay pipelines over or under water. The ship then moves forward and also leaves behind the completed and ready-to-use pipeline. From the location where the manufacturing starts to the location where that process ends, the finished pipeline wall then consists of a monolithic, jointless, solid and homogeneous structure.

31 Claims, 38 Drawing Figures

CONTINUOUS PIPELINE FABRICATION METHOD

BACKGROUND OF THE INVENTION

The present invention relates to the fabrication method, and more particularly, to the machinery, the equipment and the other means required to manufacture a pipeline wall assembly in a continuous, uninterrupted manner, with no joint, from the beginning to the end of the pipeline, with non-metallic materials.

For many centuries, large pipes of considerable length have been constructed and used to transport water. More recently, such large pipes, thousands of miles long, have been constructed to transport oil and natural gas from the point of production to the location where these fuels can be processed or distributed.

These pipelines are usually fabricated with steel tube sections brought to the site and then welded on site. This requires the transport of bulky, heavy and long pipeline sections over long distances and, sometimes, difficult terrain. The assembling, the welding and the inspection, and quality control, of these welds in the field, under difficult conditions, makes the whole operation costly and hazardous. The pipeline usually crosses regions where the climatic conditions may be very severe and vary considerably from season to season. The steel provides the structural strength, but none of the other features that are needed to insure the satisfactory performance of the pipeline and the protection of the steel from ambient conditions and from the corrosive action that the the fluid being transported may have on the steel. Therefore, usually, both inside and especially outside of the pipeline steel shell, layers of insulating and protective materials must be added, thereby increasing the cost and decreasing the reliability, and the lifetime expectancy, of large sections of the completed pipeline.

For several decades, pressure vessels, ducts and/or pipes have been fabricated using nonmetallic filaments or tapes wound around a mandrel and bonded together by a resin system matrix. Upon curing that matrix material and extracting the mandrel, the finished products can compete advantageously with shells made of the best metals. Sections of pipeline so fabricated could be assembled on site to construct the pipeline. However, the joining of various sections on site may again create the problems and difficulties just mentioned in the case of steel sections.

It is therefore desirable to eliminate the need for both transporting pipeline sections and having to assemble them on site. It is preferable to accomplish the overall fabrication task, on site, without structural or temporal interruptions.

SUMMARY OF THE INVENTION

It is a primary object of the present invention to provide an improved fabrication method of pipelines, in a continuous and uninterrupted manner.

It is another object of the present invention to provide an improved fabrication method of construction of pipelines that allows the use of raw building materials directly on site and that requires no transportation of ready-made bulky parts.

It is another object of the present invention to provide an improved fabrication method of pipelines that permits the incorporation of layers of various materials throughout the pipeline wall thickness to create structural strength, thermal insulation and of internal coating layers for protecting the pipeline structure against chemical reactions with the fluid to be transported inside and for rendering the pipeline impervious to such chemical corrosion and mechanical abrasion.

It is another object of the present invention to provide an improved fabrication method that includes the automatic incorporation of external weather protection layers on the pipeline wall.

It is another object of the present invention to provide the means to easily make use of structural materials other than metals, bonded in place by a resin system, that can be applied and assembled at the exact location where the finished pipeline section is to reside, is then laid in place immediately and is made ready for instant operation.

It is still another object of the present invention to facilitate the construction of whole pipelines by means of machinery mounted on a moving train of platforms, on which the fabrication process and all phases thereof are performed by such machinery automatically, in a programmed fashion and according to a preset schedule.

Accordingly, the present invention provides a pipeline fabrication method which results in lower construction costs, lower maintenace costs, is less hazardous to personnel, thereby resulting in a reduction in fuel cost at the delivery point.

DESCRIPTION OF THE DRAWINGS

FIG. 11-A is an enlarged partial sectional view of the front mandrel belt end drive taken along line 11-A—11-A of the front end view shown in FIG. 11-B.

FIG. 11-B is a partial view of the belt front end drive of the mandrel seen from the direction perpendicular to that indicated by the arrow shown in FIG. 11-A.

FIG. 34 is a partial sectional view of the means for laterally positioning the belts and taken along line 34—34 of FIG. 35.

DETAILED DESCRIPTION OF THE INVENTION

Figure 1:
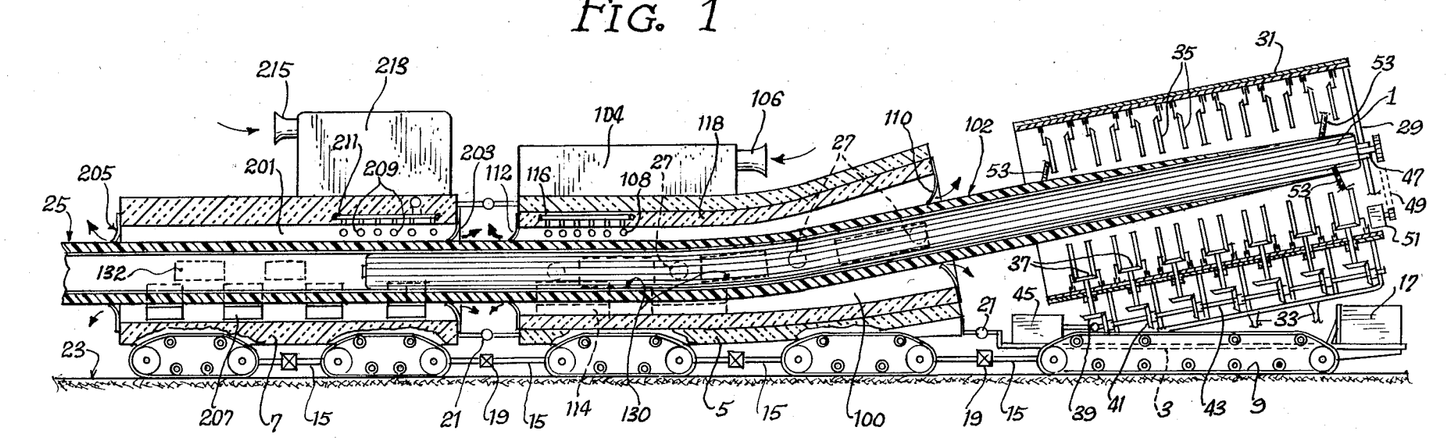
FIG. 1 is a simplified midsectional side elevation of the machinery used to fabricate pipelines according to the method of the present invention, taken along line 1—1 of FIG. 2.
Figure 2:
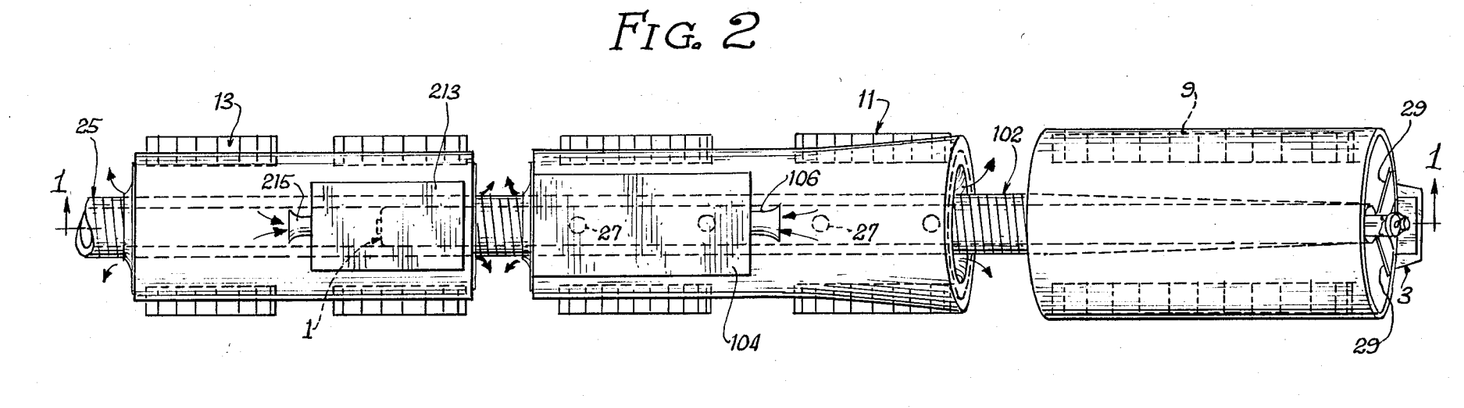
FIG. 2 is a top view of the machinery shown in FIG. 1.

Referring to FIGS. 1 and 2 of the drawings, the continuous pipeline fabrication machinery generally comprises a mandrel 1 mounted on a train of platforms 3, 5 and 7 propelled by a plurality of tracks 9, 11 and 13. Such propelling tracks are driven by power shaft 15 connected to a power plant 17 and equipped with universal joints 19 to allow the connecting power shafts to be articulated. The supporting platforms are connected by articulated joints 21 to allow some angular motion, both vertically and laterally, between each other. The platform tracks are riding on ground 23 already prepared to receive the fabricated pipeline wall 25, as it emerges from the fabricating machinery. The mandrel is flexible and articulated at a plurality of points 27 so that it can accommodate both the relative motion of the platforms and the bending of the pipeline as it is being fabricated. The front end of the mandrel is supported by a structure 29 from the front end of drum 31 mounted on the front platform and which is held by supporting structures such as 33. The drum supports and contains a plurality of pairs of revolving carrousels 35 driven by gear 37 connected to gear 39 which is in turn driven by gear 41 mounted on a common drive shaft 43 so that the carrousels in each pair rotate in opposite directions.

Drive shaft 43 is powered by engine 45. Another drive shaft 47, connected to power chain 49 driven by motor 51, provides power inside the mandrel. Power plant 17, engine 45 and motor 51 are synchronized so that the forward motion of the platforms, the apparent forward motion of the mandrel and the feed speed of the materials 53 dispensed by the carrousels are compatible so that the whole assembly can move at the same forward velocity, at all times. When the pipeline wall 25 leaves platform 3 station, the pipeline wall is physically completed, but the materials are not yet at their final fabrication stage. Material 53 used to build up the pipeline wall is a composite of reinforcing fibers (or filaments) and of a resin system matrix. To give strength and rigidity to the pipeline wall, the resin matrix material requires curing (polymerization) at elevated temperatures. Later, the composite material must be cooled.

Platform 5 supports the heating equipment which comprises a heating chamber 100 that surrounds pipeline wall 102 which is to be heated to cure the resin, a source of heat 104 to heat the air entering through duct 106, a plurality of holes 108 located in the wall of chamber 100 in order to channel and distribute hot air around the pipeline wall, and flexible finger seals 110 and 112 to enclose the volume inside chamber 100. Inside chamber 100, the pipeline wall and the internal mandrel are supported by a plurality of hot air cushions 114. While the pipeline wall material is still soft and perhaps tacky, physical contact between the pipeline wall and any solid supporting surfaces is thereby avoided. Flexible finger seals 110 and 112 exert no appreciable local pressure on the pipeline wall. The hot air for chamber 100 and air cushions 114 is distributed by a plurality of tubes 116 located throughout chamber lining 118. When the pipeline wall exits chamber 100, the resin of the wall matrix material is cured, but hot and thereby still flexible enough. In addition to or in lieu of hot air for heating means, other means such as infrared, ultrasound and microwave heating can also be used, either locally, or for the whole of chamber 100. The pipeline wall, still held by the end of the mandrel, then enters cooling chamber 201, the inside volume of which is closed by flexible finger seals 203 and 205. The pipeline wall is supported by a plurality of air cushions 207 which play a role identical to those of chamber 100. Cold air is blown into chamber 201 through a plurality of holes 209 located throughout the chamber wall lining and which are fed by means of a duct system 211 connected to the cooling equipment 213 whose function is to refrigerate the ambient air admitted through inlet duct 215. At some location where the pipeline wall temperature is low enough to allow self support of its weight, the mandrel terminates. When the pipeline wall leaves chamber 201, it is ready for being laid on the local supports set up to receive the pipeline in its final position.

Figures 3, 4, 5, 6, 7, 8, 9, 10, 11, 36, 37:
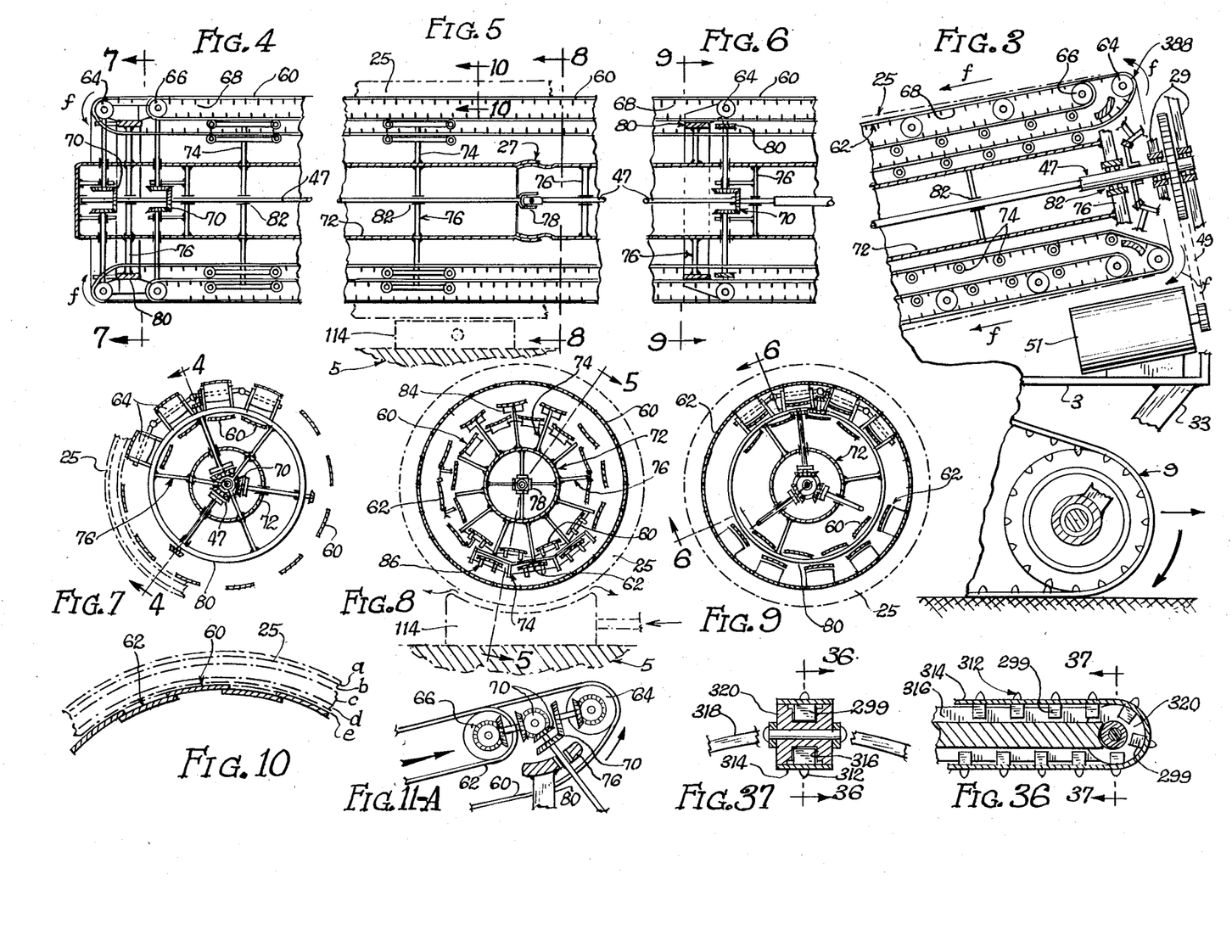
FIG. 3 is a partial midsectional elevation of the front end of the mandrel machinery presented in FIG. 1.
FIG. 4 is a partial midsectional elevation of the back end of the mandrel machinery taken along line 4—4 of FIG. 7.
FIG. 5 is a partial midsectional elevation of a midportion of the mandrel belt supporting mechanism, taken along line 5—5 of FIG. 8.
FIG. 6 is a partial midsectional elevation of a midportion of the mandrel belt driving mechanism taken along line 6—6 of FIG. 9.
FIG. 7 is a partial sectional view taken along line 7—7 of FIG. 4.
FIG. 8 is a partial sectional view taken along line 8—8 of FIG. 5.
FIG. 9 is a partial sectional view taken along line 9—9 of FIG. 6.
FIG. 10 is an enlarged partial sectional view of the mandrel belts and pipeline wall showing material layers.
FIG. 36 is a partial midsectional side elevation of the intermediary belt driving mechanism presented in FIG. 26, and taken along line 36—36 of FIG. 37.
FIG. 37 is a partial sectional view taken along line 37—37 of FIG. 36.
Figure 11:
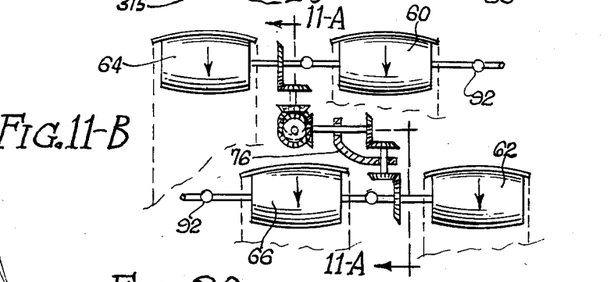

One mandrel configuration is represented in FIGS. 3 to 19. In this configuration, the outer supporting surface of the mandrel comprises a plurality of endless belts 60 and 62. Belts 60 form endless loops located externally to the endless loops formed by belts 62 to provide a continuous external supporting surface for the pipeline wall, by overlapping as shown in FIG. 10. For sake of simplification, on all figures, except on FIG. 10, belts 60 and 62 are shown as one belt, without indication of overlapping when they are joined together to form the mandrel external surface. All belts are driven in the direction of arrows f by power rollers 64 and 66 located at both ends of the belt loops and also at some points in-between, such as those shown in FIG. 6. The power rollers engage the belts by means of tabs 68 spaced along the internal surfaces of belts 60 and 62. Power rollers 64 and 66 are driven by a common drive shaft 47 by means of a plurality of gear assemblies 70, to insure a uniform and identical longitudinal motion for all belts. The length of each belt varies from one loop to the next to accommodate for the bending of the mandrel, the lower loop belts being the longest. Also, the inner loop belts 62 are shorter than the matching outer loop belts 60 for obvious reasons. The drive shaft, the gear assemblies and the belt supporting bogie assemblies 74 are all supported by a plurality of structural members 76 mounted on core 72 of the mandrel. Various segments of mandrel core 72 are articulated at both ends with each other by means of ball joints 27. At any location of such ball joint, the central drive shaft is equipped with a universal joint 78 to permit the same degree of rotation as that provided by ball joint 27. At all locations where such joints are provided, the pipeline wall material is still pliable enough to accommodate such bending, which is only a few degrees per joint.

In the mandrel configuration depicted in FIGS. 3 to 17, the overlapping of belts 60 and 62 on the external mandrel surface requires an even higher degree of overlapping of the belts inside the mandrel. This is made possible by separating the belt return inner loops and supporting them separately. Belts 60 return along inner loops that form a circle inside the mandrel with a diameter smaller than that formed by the inner loops of belts 62. Intermediate annular supporting structures 80 located between those two circles are connected to the other structural members 76 that also support bearings 82 designed and positioned to guide drive shaft 47.

Figures 12, 13, 14, 15, 16, 18, 19:
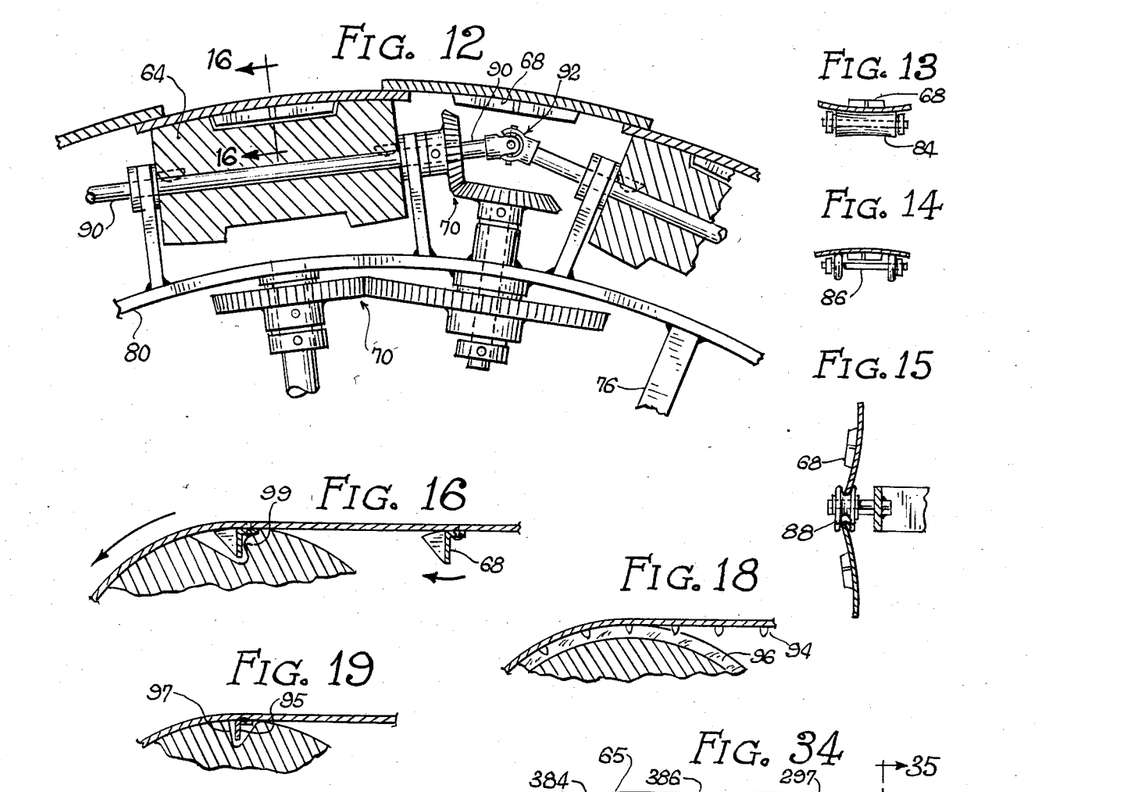
FIG. 12 is an enlarged partial sectional view of the intermediary belt driving arrangement of FIG. 6.
FIG. 13 is a detail side view of the supporting roller of a return belt.
FIG. 14 is a detail side view of the supporting roller of a belt shown in a pipeline support position.
FIG. 15 is a detail side view of the supporting roller located between two return side belts.
FIG. 16 is a detail partial side elevation sectional view of a belt engagement with one of its driving wheels taken along line 16—16 of FIG. 12.
FIG. 18 is a detail partial sectional view of a belt and its end guiding roller.
FIG. 19 is a detail partial sectional view of a belt and its guiding roller showing the accommodation of a driving tack.
Figure 17:
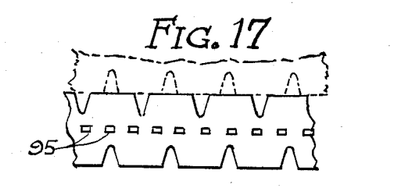
FIG. 17 is a partial top view of a mandrel belt showing its spatial relationship with the next belt.

Along their return loops, belts 60 and 62 are supported differently according to their location on the mandrel transversal cross-section as shown in FIGS. 8 and 9. No substantial amount of tension is applied onto the belts on their return loop. If unsupported, they would sag downward on account of gravity and interfere with each other. To prevent this from happening and to keep each individual belt at its assigned station around the mandrel, three types of rollers are used to support the belts: one type for the upper section of the mandrel, such as 84, another type such as 86 for the lower part of the mandrel and yet another type such as 88 for each side of the mandrel. The same applies to both belts 60 and 62. The details of FIGS. 13, 14 and 15 show how the belts are supported in the case of each type. The details also show how non-interference with tabs 68 is assured. The application of the pipeline material on the external surface of the mandrel is achieved so that some pressure is always applied on the mandrel surface by the pipeline wall. This insures that the outer loops formed by the belts are always pressed against the driving rollers 64 or 66. To facilitate the bending of the belts, which have a natural transversal curvature, around the end driving rollers, the edges of the belts are notched and mesh as shown in FIG. 17. Otherwise, with metallic belts, the surface of the end driving rollers would have to be cylindrical, in contrast with the barrel-like cross-section illustrated in FIG. 12. Each end driving roller needs not be driven individually. This is shown in FIG. 12 where an illustration of one master roller driving one or more of the adjacent driving rollers is depicted. This is done by means of shaft 90 and universal joint 92.

The detail partial assembly of belt, engaging tabs and end driving roller shown in FIG. 16 indicates that the tabs do not affect the bending of the belt around the roller and that contact 99 between the tab and the driving roller is made close to the tab attachment on the belt. FIGS. 18 and 19 show two variations of a way to accommodate the engagement of small tabs 94 and 95 inside either a groove 96 or small recesses 97 located on the surface of the driving roller. Such small tabs 95 are also shown in FIG. 17. They help keep the lateral motion of the belts to a minimum.

Figure 20:
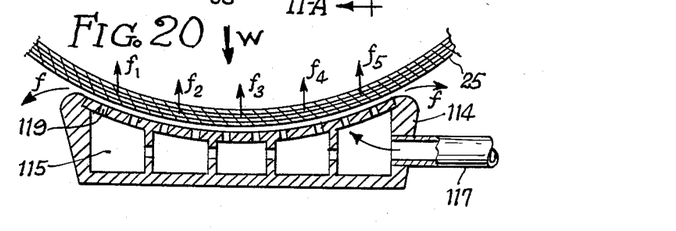
FIG. 20 is a partial sectional view of the bottom part of the pipeline wall shown supported by an air cushion.

FIG. 20 illustrates the way the weight W of a longitudinal portion of the pipeline wall and mandrel assembly is balanced by the elemental forces $f_1$, $f_2$, $f_3$, $f_4$ and $f_5$ developed by the pressure from the pressurized air that tries to escape from air cushion box 115. High pressure air is supplied inside box 115 by duct 117 and escapes through a plurality of holes 119, thereby creating an air space between the rigid upper curved section of the box and the pipeline wall. The air finally escapes as shown by arrows f. Lateral motion of the pipeline is prevented by means of other similar air cushion boxes 130 and 132 located on each side of the pipeline wall.

Figures 21, 35:
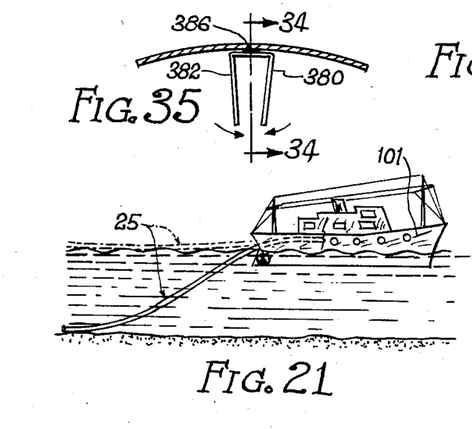
FIG. 21 is a side elevation view of a variation of the arrangement of the pipeline fabrication and laying being performed over water from a ship.
FIG. 35 is a partial sectional view of the means for laterally positioning the belts and taken along line 35—35 of FIG. 34.
Figures 22, 24, 25:
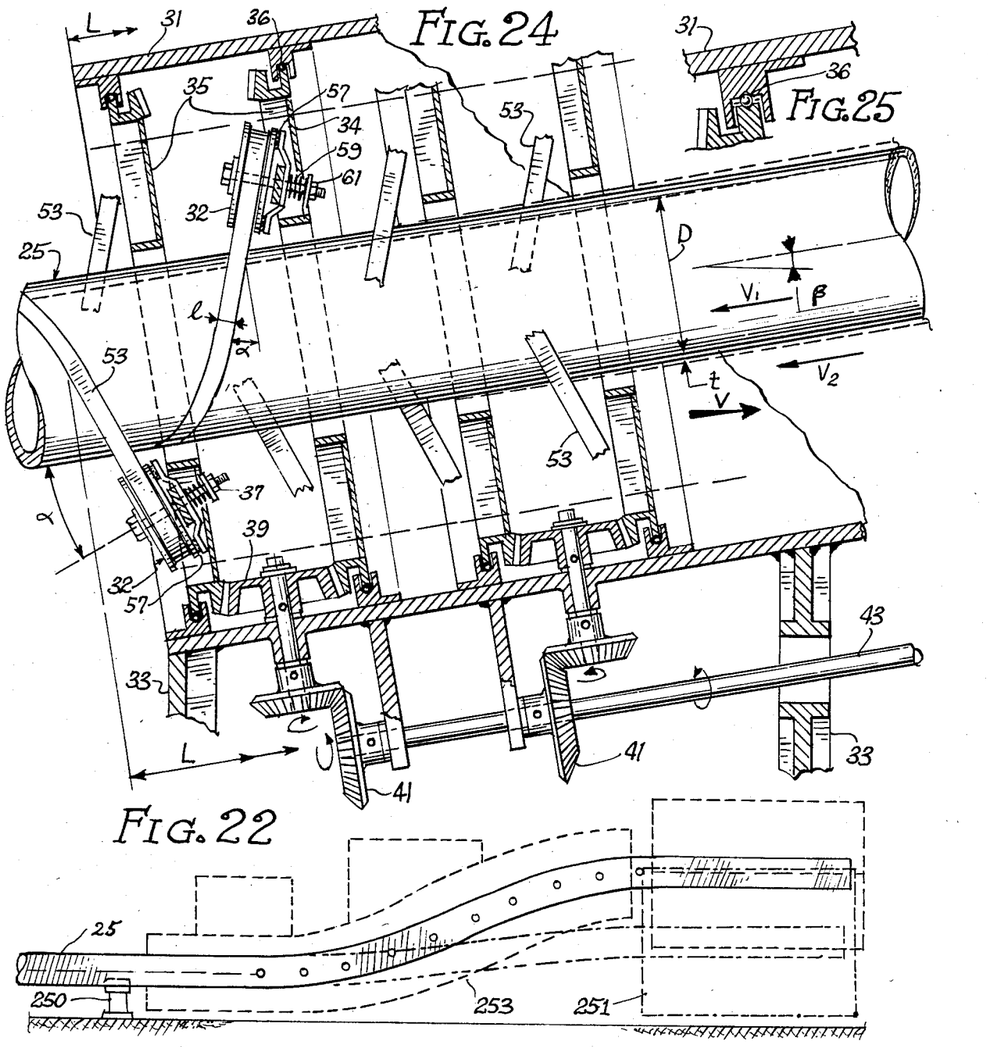
FIG. 22 is a schematic side elevation of another arrangement of the pipeline fabrication and laying apparatus.
FIG. 24 is a partial midsectional side elevation of the tape winding and applying means.
FIG. 25 is a detail sectional view of the support of a typical carrousel holding the tape drums.
Figure 23:
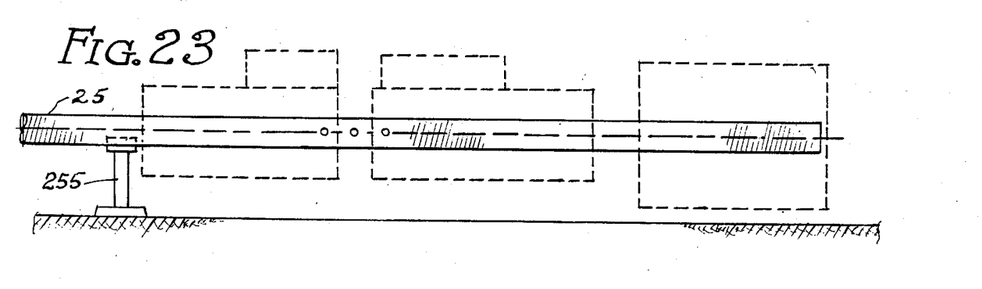
FIG. 23 is a schematic side elevation of another arrangement of the pipeline fabrication method, in which the pipeline is not subjected to bending during construction.

FIG. 21 indicates how the fabricated pipeline emerges from a ship 101, in which the fabrication machinery is installed. The pipeline can either float or sink to the bottom, depending upon whether water is allowed inside the fabricated pipeline. In all instances, either over land or water, the ground must be prepared to clear the way for the machinery and to receive the fabricated pipeline. FIGS. 22 and 23 illustrate two basic ways of laying down the pipeline on land. In FIG. 22, the pipeline is laid close to the ground on short supports 250 and the front end of the machinery must be elevated as shown by the phantom lines, which necessitates at least one bend in the pipeline during fabrication. FIG. 23 shows a taller support 255 such that the pipeline can be fabricated with no or very minor bending being required. In any case, a minimum amount of pipeline bending cannot be avoided. In FIG. 22, the lowering of the material application machinery to a position such as 251 indicates how much the degree of bending of the pipeline can easily be reduced. Inclining the material application drum 31 as is shown in FIG. 1 also reduces the amount of bending. Reducing the amount of pipeline bending also reduces the amount of shearing, stretching and compression imposed on the pipeline wall material. Eliminating the need for drum 31 inclination is certainly desirable but not mandatory.

The partial longitudinal cross-section of drum 31 of FIG. 24 is used to demonstrate how the pipeline wall material is applied on the mandrel (not shown for the sake of simplifiation). The material in the form of tape 53 (or filaments) is stored on a plurality of spools 32 mounted at an angle on carrousels 35 at several locations around the carrousel structure 34 which is guided in drum 31 by bearings 36, the detail of which is shown in FIG. 25. The common drive shaft 43 imparts their rotating motion to all carrousels by means of gears 37, 39 and 41 in a manner such half of the carrousels rotate in one direction and the other half in the opposite direction, alternatively. This results in having half of the material wound along an helical path clockwise, and the other half also wound helically, but counter-clockwise to eliminate the risk of unidirectional stresses developing inside the pipeline wall and also to give longitudinal strength to the wall. The pipeline can then be considered an endless pressure vessel.

A basically different mandrel configuration is presented in FIGS. 26 through 35. The mandrel outer surface of this configuration also comprises a plurality of endless belts, but only half the number of belts are used. There is a gap between each belt, even on the return internal loop, as typically shown by gap 301 between belts 65 and 67 of FIG. 29. Supporting structural members such as 303 and 305 connecting the external hoop structures 307 and 309 to the central structures 311 and 313 have room to go through these gaps, without interfering with the belt inner loops. All belts, on both sides and for both loops are supported and guided by a plurality of grooved rollers 315 and 317 attached to external hoop structures 307 and 309. The connecting internal structure members such as 311 support a plurality of inner support rollers 319 mounted on supporting members 323 connected to internal hoop structures 321. A central hollow shaft 325 connects the front end support structure 327 to the back end support structure 329. A compression spring 331 located between structure axle 333 and central sleeve 313 sets all belts under tension by pulling the belts backward. This pulling action is reacted by the rollers mounted on structure 327, located at the front end, which is solidly attached to the front end of central shaft 325 by means of flange 335. Central shaft 325 does not rotate but is equipped with a few balljoint articulations such as 337, to permit an overall flexibility to the mandrel assembly.

Figures 28, 32:
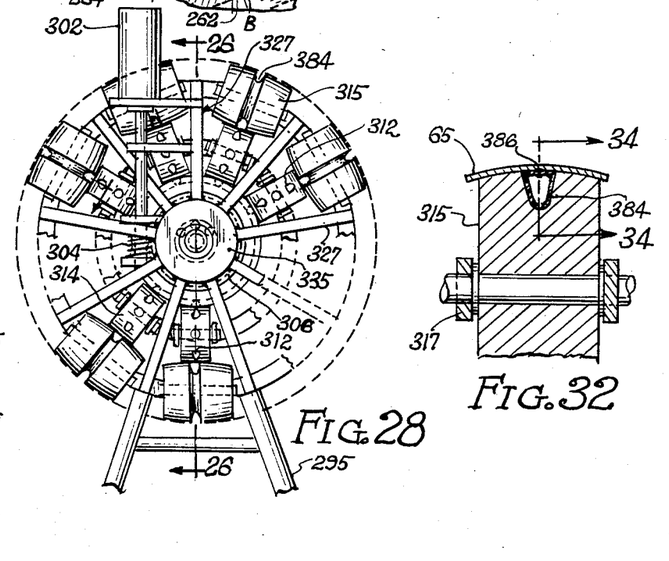
FIG. 28 is a frontal view of the mandrel belt driving mechanism presented in FIG. 26.
FIG. 32 is an enlarged partial sectional view of a belt supporting roller of the alternate arrangement of the mandrel belt drive.

Central sleeves 313 are prevented from interfering with balljoint articulations 337 by stops 339 solidly affixed to central shaft 325. The central sleeves not located next to balljoint articulations are allowed some freedom of longitudinal movement, but are guided laterally by longitudinal slots such as 341 that are cut on the sleeve and in which peg 343 inserted in the central shaft can slide. Similar peg-and-slot arrangements are used to prevent the ball joints 337 and axle 333 from rotating axially with respect to central shaft 325. In this mandrel configuration, the belts are provided with a plurality of winged tabs as shown in FIGS. 34 and 35. The tab wings 380 and 382 are flexible and can come together to fit the roller groove 384 of roller 315 as shown in FIG. 32. As a tab approaches a roller 315, as illustrated in FIG. 34, the tab wings are pushed inward as shown by the arrows of FIG. 35 and belt 65 becomes fully guided laterally. The winged tabs can be either spot welded or riveted to the belts to prevent their rotation but still to permit bending of the belt without interference, as depicted in FIG. 34 by the arrow. The wrapping of the belt around the front end and back end guiding rollers thus does not generate local stresses in the tab attachment.

Figures 26, 27:
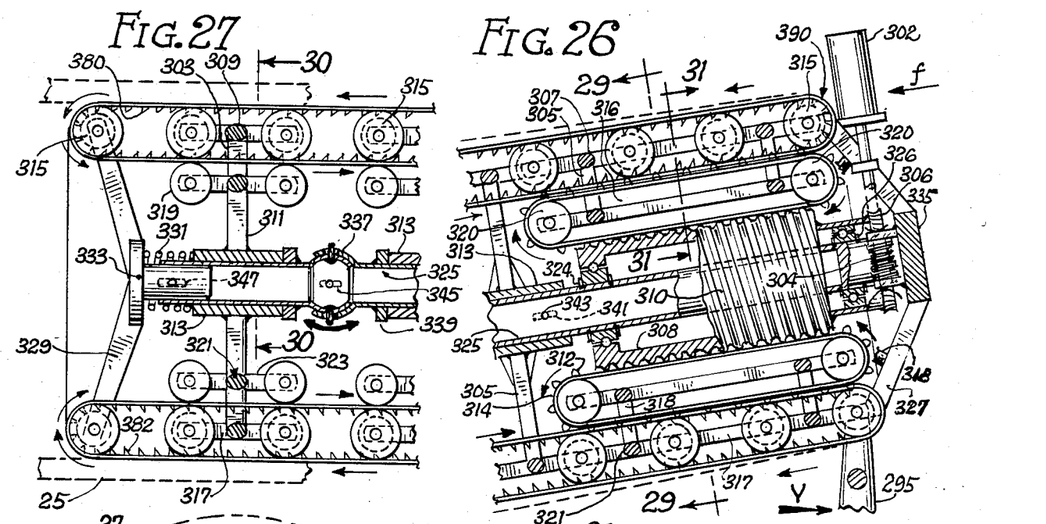
FIG. 26 is a partial midsectional side elevation of the front end of an alternate arrangement for driving the mandrel belts, and taken along line 26—26 of FIGS. 28 and 29.
FIG. 27 is a partial midsectional side elevation of the back end of an alternate arrangement for guiding the mandrel belts, and taken along line 27—27 of FIG. 30.

The belts are pulled at the front end of the mandrel and the return inner loops are under tension at all times, which eliminates the need for transmission of the mandrel driving power to its back end. The tension on the belt inner loops effects that transmission of power. The pulling action on the mandrel belts 67, in the inner loop section, is accomplished by means of short adjacent flat endless belts 314 driven in their own inner return loop section as shown in FIG. 26, within the cylindrical space determined by the belt inner loops. A motor 302 mounted on structural member 327 drives a worm gear pinion 304 engaged by a worm gear wheel 306 mounted on an inner drum 308 centered on central shaft 325, free to rotate, but prevented from moving axially on central shaft 325 by stops 324 and 326. A plurality of helical grooves 310 are located on the outer cylindrical surface of inner drum 308. These grooves engage protruding tips 312 fastened on endless flat belts 314 supported and guided by rigid tracks 316 located between two sets of end rollers 320, as shown in FIGS. 36 and 37. End rollers 320 and rigid tracks 316 are mounted and supported by a structure assembly 318 connected to the front end main structural members 317 and 327. Sliding blocks 299 solidly fastened to endless belts 314 are guided and laterally restrained by tracks 316. Protruding tips 312 engage endless belts 67 through holes 297 in belts 65 and 67 that are interspersed between winged tabs 380-382. The complete mandrel front assembly is then supported by structure 295 which is connected and affixed to the drum assembly 31 of FIG. 1.

Figures 29, 30, 33:
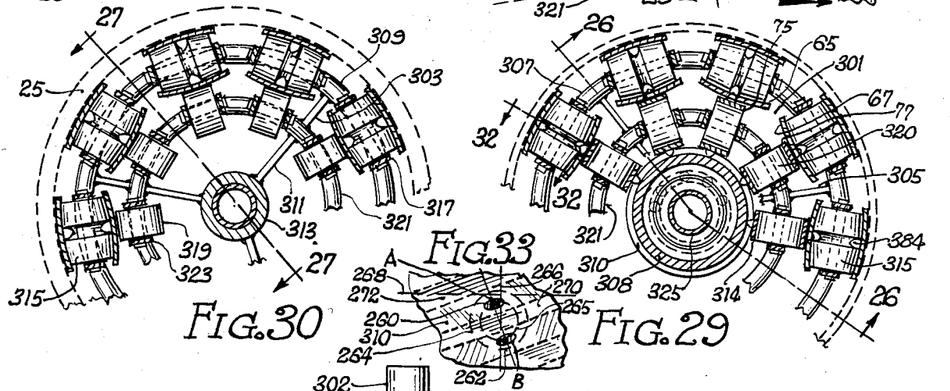
FIG. 29 is a partial sectional view taken along line 29—29 of FIG. 26.
FIG. 30 is a partial sectional view taken along line 30—30 of FIG. 27.
FIG. 33 is a top view of the detail of some typical parts of the alternate mandrel belt drive arrangement of FIG. 26.

FIG. 33 presents a top view of a protruding tip 312 that is shown in phantom line, for the sake of clarity, engaging helical groove 310 at points A and B. A point contact is not desirable and two areas of contact such as 260 and 262, outlined in solid line on the side walls of helical groove 310, offer a more adequate type of sliding contact. These areas 260 and 262 also represent matching facets cut onto protruding tips 312 surface. Phantom line 264 represents the outline of the base of protruding tip 312 that engages hole 297 in endless belts 67. Phantom line 265 indicates the center line of the two facets on protruding tip 312 surface and corresponds to line 265 of FIG. 31. Line 266 represents inner drum 308 axis of rotation and line 268 represents the section plane that corresponds to FIG. 31. The helical groove bottom 270 and the external surface 272 of inner drum 308 are indicated for reference in FIGS. 31 and 33.

As FIG. 1 indicates, the belt loops located at the bottom of mandrel 1 must be longer than those located at the top. It means that half of the belt loops must be of various length. To obviate this discrepancy, belts can be wound around the mandrel, one turn around the mandrel along the mandrel whole length. The return loop of the belt can then be wound along an helix of same angle with reverse pitch. All belt support and guiding rollers can also be slightly tilted to accommodate such a shift. Another approach consists in using only one single endless loop incorporating all belts, if the whole surface of the mandrel needs not be fully covered with belts. In such case, the helix angle made by each belt is negligible. As can easily be seen from the belt/roller arrangement shown in FIGS. 11-A and 11-B, a slight lateral sliding of the belts on their guiding and driving rollers can readily accommodate such slight tilting of the belts as required to create the very small helix angle needed.

However, the outer surface of the mandrel must slightly turn, in both cases, with respect to pipeline wall 25, by the amount of the total angle made by the belt helix along the mandrel full length. The pipeline wall cannot rotate, therefore, the mandrel outer surface must be allowed to twist relative to the pipeline wall internal surface. The outer belt external surfaces must simply be permitted to slide laterally, very slowly, with respect to the pipeline wall. To facilitate such motion, lubrication and/or release agents are introduced at points such as 388 in FIG. 3 and 390 in FIG. 26, on the belt outer surfaces, by means not shown. Also, the internal surfaces of the first tapes applied on the mandrel, to form the pipeline inner wall surface, can be coated with solid lubricants.

DISCUSSION AND OPERATION

Figure 31:
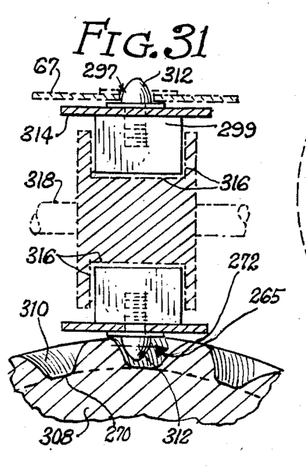
FIG. 31 is an enlarged sectional view of the alternate mandrel belt driving mechanism presented in FIG. 26.

Under normal operating conditions, the train of platforms 3, 5 and 6 moves forward at a given velocity. The outer surface of mandrel 1 moves in the reverse direction at a speed relative to the platforms which is the same as the forward speed of the platforms, in absolute value. The pipeline wall 25 emerging at the end of the last platform then has no velocity relative to the ground. Left behind the platform train is an in-place, still and completed pipeline assembly, ready to use. As long as the materials entering into the manufacturing process are kept available and fed into the machinery, and as long as the machinery operates satisfactorily, the fabrication and production of the pipeline is uninterrupted and continuous. It could go on, nonstop, from the point where the platform train starts its journey to the point where the pipeline is to end or change its inner diameter dimension. The pipeline wall is constructed from the inside surface outward, to its outer surface. As the pipeline fabrication progresses inside drum 31, material is added to the wall as programmed to build up the pipeline wall, until completion, where it leaves the back end of drum 31.

The means of propulsion of the platforms and the means of generating the backward movement of the pipeline wall are coordinated and synchronized at all times. Any lateral motion of the platforms, relative to each other, is duplicated and followed by an equal lateral motion of the mandrel and pipeline wall. The funnel shape of the front part of chamber 100 of platform 5 is intended to accommodate the bending of both the mandrel and the still pliable pipeline wall, laterally, in any direction. The operation of the means described earlier for imparting their motions to the belts that constitute the outer surface of the mandrel is obvious from the description herein. The basic difference between the mandrel outer surface of the configuration shown in FIGS. 3 through 16 and that of the configuration shown in FIGS. 26 through 32 consists in the extent of the support given by these surfaces to the inner surface of the mandrel wall. In the case of the first configuration, the mandrel surface is continuous; whereas, in the case of the second configuration, the mandrel surface is not continuous. The need for continuity of the mandrel surface, in the latter case, is easily obviated as is explained below.

The number of carrousels 35 shown in FIG. 1 is not limitative. As many as needed to build up the pipeline wall thickness are located in drum 31. However, their total number is always even, as they operate as a pair and are "twin" carrousels. Each pair of such twin carrousels (each carrousel rotating in a direction inverse from that of the other, but driven by the same gear) stores and applies the same type of material on the mandrel/pipeline wall assembly. The type, nature and composition of such materials are determined by the constitution desired for the completed pipeline wall, along its thickness. FIG. 10 shows such a typical, but not limitative, constitution that consists of five layers of different but typical materials: (1) layer "a" can be a material used for weatherizing the pipeline wall, layer "b" can be the thermal insulation material, layer "c" is the material used to provide its structural strength to the pipeline wall, layer "d" can also be another thermal insulation wall and layer "e" (innermost layer) is intended to be the physical and chemically impervious barrier from the fluid (gas, liquid or slurry) to be transported by that pipeline. Some of these layers may or may not be bonded to the adjacent layers, depending upon the design requirements of the finished item.

Once started, the pipeline fabrication process proceeds in a continuous fashion, but one step at a time, spatially. Beginning with the first pair of twin carrousels, the material, in form of tapes 53, is applied at an angle $\alpha$ with respect to a line perpendicular to any generatrix of the mandrel outer cylindrical surface. The carrousels, being contrarotating in each pair, by their rotating motion around the mandrel, cause the tapes coming from the spools on one carrousel to be wound at a pitch angle ($\alpha$) symmetrical, with respect to any generatrix, with the pitch angle ($-\alpha$) made by the tapes coming from the spools located on its twin carrousel. It should be mentioned though that the tapes coming from one carrousel do not intertwine with the tapes coming from its twin carrousel, but that they lay on top of each other. Intertwining these tapes would require a higher degree of machinery mechanical complexity without adding to the quality of the final product. Each adjacent and successive layer of laid tapes then form helices of pitch angle "inverse" of that made by the helices of the next layer tapes, although, each helix so formed has the same absolute value pitch angle as that of any other helix. Depending upon the mandrel diameter D, the width of the tapes 1 and angle $\alpha$ of the winding, only a well determined portion of the mandrel surface is covered by these two tapes. In all instances, full coverage of the mandrel surface, or of all the other layers previously applied, as the case may be, is required. To insure this, a plurality of tape storing and dispensing spools 32 are mounted on each carrousel. The axis of these spools makes an angle $\alpha$ with the mandrel axis so that the correct winding angle $\alpha$ is always maintained. The number of these spools on each carrousel is then well determined for given values of D, l and $\alpha$, since tapes in each layer must be laid edge to edge. In some instances, some amount of tape overlapping is desired, as is the case for the inner sealing impervious layer in contact with the mandrel. Assuming a mandrel diameter D, a thickness t for the completed pipeline wall, the angle $\alpha$ for the spool inclination of each pair of carrousel must be adjusted downward by the ratio $D/(D+2t)$ approximately, between the first pair of carrousels and the last pair, or over the length L of drum 31.

Another aspect of the tape winding process that needs clarification pertains to the inclination of the mandrel and of the carrousels with respect to platform 3. If the ground, the platform bed and the axis of drum 31 were parallel, the platform velocity V, the mandrel velocity $V_1$ and the speed $V_2$ at which the pipeline wall is being fabricated would be equal in absolute value.

However, when that condition is not met, as is the case in FIGS. 1, 3, 24 and 26, assuming that the mandrel axis makes an angle $\beta$ with the platform bed (or the ground), both $V_1$ and $V_2$ must be larger than V in absolute value, so that the finished pipeline wall appears still with respect to the ground. V, $V_1$ and $V_2$ are related as follows: $|V_1| = |V_2| = |V| \times \text{cosine } \beta$. The cosine values of $\beta$ are close to 1 for values of $\beta$ up to 15°, for example: 0.9848 for 10°; 0.9659 for 15°. $\beta$ can be kept at values lower than 15°, which means that $|V_1|$ and $|V_2|$ do not have to exceed $|V|$ by more than 3.5%. Depending upon the plasticity of the pipeline wall when heated on the mandrel, at the beginning of the resin curing process, this factor of 3.5% can either be ignored, which would cause a slight increase of the average value of t, or taken into account by making $|V_1| = |V|$ and $|V_2|$ larger by 1/cosine $\beta$. The latter would cause some sliding of the pipeline wall during the wall thickness buildup and locally some extra tension on the mandrel belts. This would most likely results in a combination of these three side effects. If equally important, each effect could then take care of about ⅓ of the "give-in" amount, or approximately 1%, which is almost negligible. The configuration illustrated in FIGS. 22 and 23 disposes of this discrepancy, either altogether or at least during the tape winding process.

The revolving motion of the carrousels forces the tapes 53 to unwind off spools 32 and to wind on the mandrel. A certain amount of tension must constantly be applied on the tapes for various reasons such as: to prevent the tapes from flapping, to insure that the tapes contact the mandrel at the correct location and at the right angle, so that voids, blisters and the like are avoided. This tension on the tapes is created by brakes 57 which apply a drag torque on spools 32. This braking action can be adjusted by springs 59 by means of adjustment nut 61. the spool assemblies are attached to the carrousel flanges 34 by mounting brackets 37. The tape material may consist of structural, insulating, "impervious" tape such as "mylar" coated or uncoated as desirable, or weather proofing material, depending upon which pipeline wall layer is being built up and the specific function that this layer is expected to perform. The tape may or may not be preimpregnated with the resin system, as programmed. Should external application of resin matrix material, bonding agent or the like be required, this can be done by using such material itself in the form of tape or by applying such material on the tape being wound, between the spools and the mandrel, or on the outermost layer already in place. Means for performing such functions are not shown, but are state-of-the-art and need no additional discussion.

Upon leaving platform 3 station, the pipeline wall is formed, incorporates all the materials that enter in its construction, but it still lacks its final strength characteristics. The reinforcing material that gives strength to the wall is present and in place inside the wall, but the presence and the quality of the binding forces between the reinforcing filaments of the tapes is still lacking. The resin needed to effect such binding is also present, but it must first be made to penetrate void interstices, to adhere to the filaments and to acquire strength and other physical properties needed. Because of the winding tension applied on tapes 53 during the winding process, the wall material is under some compression. As the pipeline enters heating chamber 100 mounted on platform 5, the pipeline wall becomes heated by the surrounding hot air, radiations from heat lamps or microwaves, as may be most desirable. A combination of such means of heating can also be used. Microwave heating deposits heat in depth and would be most appropriate near the entrance of chamber 100, with proper consideration being given to the fact that metals are present in the mandrel. As the pipeline wall heats up, the resin material softens and becomes viscous. It can then flow into the voids between the filaments and improve the contact between the filament skin and the matrix material. The temperature inside the wall is maintained at the temperature level most suitable for curing the resin. The length of chamber 100 and the velocity of the supporting platform determine the residence time of the pipeline wall inside the chamber. The choice of resin system is then dictated and determined by the practical values that are acceptable for platform 5 velocity and length. Somewhere in the front half of chamber 100, the pipeline material is in its most pliable state. This is where the major part of the pipeline bending is programmed to take place as shown in FIG. 1. When the pipeline wall leaves chamber 100, the resin material is almost totally cured, hot and completing its final curing. At this point, the wall strength is such that it has become self supporting, without risk of any appreciable sagging of the upper part occurring later, before the wall enters the cooling chamber. At this point, some support from the mandrel can still be provided, as shown in FIG. 1, although shortening of the mandrel is of course desirable.

The pipeline then enters cooling chamber 201, needed to keep the overall length of the train of platforms manageable. It is thought advisable to keep the length of hot pipeline within limits and that, when the pipeline wall leaves the manufacturing area, its outer skin temperature is not much higher than 130° to 150° F. In the cooling chamber, cold air is blown against the wall, water spraying can be added, so that the wall temperature is brought down as quickly as possible. Additional cooling means can be channelled in from the front end of the mandrel, all the way to its back end, inside the mandrel. Space is available there for locating such channels. These additional cooling means are not shown for the sake of clarity of the drawings. The cooled down, but still warm pipeline wall leaves the cooling chamber to emerge at the end of the platform train. At this juncture, it is automatically laid on preset pipeline supports 250 or 255. At this point, the pipeline fabrication can be considered completed. Whatever residual cooling and curing left to take place then has a long time available, until the pipeline is put to use.

The loss of heating and cooling media is minimized thanks to the use of flexible finger drag seals. They allow some lateral motion between the pipeline wall and chambers 100 and 201, without exerting localized pressures on the pipeline wall. The air cushions provide ample support and non-physical contact of solid parts with the pipeline wall. Nevertheless, adequate movement freedom is permitted to the pipeline wall to take care of all miscellaneous relative displacements of the wall with respect to the surrounding machinery parts, without risks of damaging contacts being made. The pressure boxes for the air cushions can also be equipped with flexible drag seal skirts, as is well known in the case of ground effect machines. Such a feature allows an even greater degree of possible relative vertical and lateral movements of the pipeline wall.

The lubrication means of the bearings and gears inside the mandrel are not shown on the drawings, although present. The operating temperatures of these components vary according to their location along the mandrel length. These temperatures are the highest at the locations which correspond to the second half of the second platform. Pipes can bring high temperature lubricant from the front end of the mandrel. Such lubricant can then be distributed where needed. It might be easier to make use of prepacked dry lubricants, at the hotest locations, or wherever it is most advantageous, because, in all instances, the relative velocities of all moving parts are all extremely low. No appreciable heat is generated locally by the friction of these moving parts. State-of-the-art lubrication means can be used in such an application and the subject needs no further discussion.

To facilitate the release of the belts from the internal surface of the finished pipeline wall, at the back end of the mandrel, minimal adherence between that surface and the belt outer surfaces must be insured. To that effect, a release agent of a non-film forming nature, is applied on the outer surfaces of the belts as they roll around the front end guiding rollers. In addition, care is taken to prevent any resin from seeping through the impervious inner layer of the pipeline which is applied directly against the mandrel belts. This release agent can also act as lubricant between the belts and the pipeline wall, at various stages of its fabrication, to facilitate any slight, both longitudinal and lateral, relative movement between the belts and the pipeline wall.

All spools on the carrousels of each pair are loaded with the same amount of tape (or filaments) when installed. Spools are removed when empty and replaced with other fully loaded spools, at the same time for each pair of carrousels. The ends of the already wound tape and of the new tape to be wound are spliced together. When all tapes from all new spools on that pair of carrousels have been spliced, the winding process is resumed. The reinforcing tapes (or filaments) exhibit no strength discontinuity. The splicing operation is programmed to insure that the splices are positioned on the pipeline wall at close but still slightly different longitudinal stations, to avoid localized bulging. The access to spools such as 32 of FIG. 24 is through windows (not shown) cut in drum 31. Each spool on all carrousels can be accessed to by means of its own window. The length of any material to be wound and present on a fully loaded spool, although the same for all spools of any pair of carrousels, varies for each pair of carrousels. This is meant to distribute the splicing stations between various layers as uniformly as possible, along the whole length of the pipeline. Because tapes of different nature can be spliced together, as a new fully loaded spool is installed to replace an empty one, the thickness and composition of the pipeline wall can easily be adjusted, as the pipeline is being produced. These changes are preprogrammed and introduced in a very gradual manner.

Pipelines usually are not an entirely continuous, uninterrupted tube several thousands of miles long. They normally extend from one pumping station to another. In any case, each section of pipeline must have a beginning and an end. Depending upon the type of connection desired between the pipeline and the station (for pumping, distribution, etc ... ), the pipeline wall can be terminated in two basically different ways. One approach consists in fabricating an extra length of pipeline at each end of that section, sectioning off that extra portion, then attaching the male part of the connection to the sectioned off end of the pipeline wall. The other approach consists in building up the pipeline wall at the end of each section, using the same materials as those used for the wall structure, but shaped to form the connection shape desired. In the latter case, the tape winding process described in the present invention is not used to construct that connection, although the reinforcing material is the same and the tapes maintain their continuity. The details of such connection fabrication need no further discussion herein as they are deemed beyond the scope of the present invention and are well known in the art.

The various embodiments of the present invention described and discussed above result in providing a fabrication method of pipelines in a continuous and uninterrupted manner such that, between the beginning and the end of a mobile fully integrated machinery complex, all materials used, all manufacturing processes needed and all operations are sequentially introduced according to a preprogrammed fashion. All fabrication phases required to complete the construction of the pipeline are performed in a scheduled way to insure product uniformity and quality assurance automatically. The finished product, ready to use, emerges at the end of the machinery and in place. A judicious and ideally proportioned combination of the types and natures of materials, amounts of such materials and modes of application of such materials that are all available for use with these embodiments provides the means for fabricating an optimally designed and constructed pipeline, in place, at lower cost, more rapidly and more efficiently than the segmented construction techniques used for steel pipes. The latter require delicate fabrication methods, such as welding, X-ray, etc ... , that cannot be performed efficiently and at low cost, in the field, in areas that are sometimes very far from civilization, under very hard climatic conditions. The fabrication method described in the present invention makes the transport of fuels such as natural gas, crude oil and coal slurries easier, less expensive and easier in regions of difficult access or with very cold weather.

Having thus described my invention, I claim:

1. The method of forming a continuous, jointless and uninterrupted reinforced plastic pipe comprising the steps of:

forming a continuous articulated mandrel;

supporting the mandrel at a plurality of mobile stations;

advancing the stations to carry the mandrel along forwardly at a predetermined speed;

winding strands of a material preimpregnated with a resin about a forward end of the mandrel at a forward one of the stations;

moving an external surface of the mandrel rearwardly as the strands are being wound to carry a pipe structure formed thereby rearwardly without any relative sliding motion between the external surfaces of the mandrel and of the strands;

curing the resin in the pipe structure at an intermediate one of the mobile stations located behind the forward station;

cooling the pipe at a rearward one of the stations located behind the intermediate mobile station; and extracting the external surface of the mandrel continuously from inside the pipe at a rearward end of the mandrel without any relative sliding motion between the external surface and the pipe.

2. The method as claimed in claim 1 in which said strands are wound at helical angles, all said angles having substantially the same absolute value, but with half of the strands being wound along one helix pitch and the other strands being wound along a reverse helix pitch.

3. The method as claimed in claim 2 in which said strands are dispensed by spools mounted on counterrotating carrousels supported by a common revolving drum.

4. The method as claimed in claim 3 in which each carrousel is caused to rotate at the same rotational velocity as the two contiguous carrousels, but in the reverse direction so as to generate the two reverse pitch helices along which the strands are being wound.

5. The method as claimed in claim 3 wherein the step of advancing the stations occurs on land over prepared terrains.

6. The method as claimed in claim 4 in which the strands are supplied, applied and wound in tape form.

7. The method as claimed in claim 4 in which the strands are supplied, applied and wound in filament form and have substantially a circular cross-section.

8. The method as claimed in claim 1 including the steps of vertically supporting the pipe wall externally during the resin curing and cooling down steps, until the pipe external surface can safely be mechanically contacted, preventing thereby any mechanical contact between the unfinished pipe wall and all surrounding solid parts and components.

9. The method as claimed in claim 1 including the steps of laterally guiding the pipe wall externally during the resin curing and cooling down steps, until the pipe external surface can safely be mechanically contacted, thereby preventing any machanical contact between the unfinished pipe wall and all surrounding solid parts and components.

10. The method as claimed in claim 1 in which the tension exerted on the strands being wound is adjustable and used to control the amount of compression imposed on the pipe wall during the resin curing step, as required to densify the pipe wall materials and keep them free of voids, cracks and interstices.

11. The method as claimed in claim 1 in which the forward movements of the strand winding station, the resin curing and cooling stations are synchronized and coordinated with the formation step of the mandrel external surface and the extraction step of said mandrel external surface from inside the pipe wall.

12. The method as claimed in claim 1 in which a small amount of lateral sliding movement of the pipe wall relative to the mandrel external surface is allowed and facilitated by introducing lubricants at the interface between the mandrel external surface and the pipe wall internal surface.

13. The method as claimed in claim 1 including the steps of
forming a mandrel closed external surface continuously and uninterruptedly in a controlled manner,
driving and guiding endless belts to form said mandrel external surface, providing a small amount of belt overlapping,
guiding said endless belts along their return inner loops that are located internally to the mandrel external surface,
supporting, driving and guiding said belts on their outer loops at intervals along the full length of said mandrel,
and supporting and guiding said belts on their inner return loops at intervals along the full length of said mandrel.

14. The method as claimed in claim 1 including the steps of
forming a mandrel open external surface continuously and uninterruptedly in a controlled manner,
driving and guiding endless belts to form said mandrel external surface, and providing a small gap between contiguous belt edges so as to leave some open spaces between all belts,
driving said endless belts at the front end of the mandrel by pulling on the inner loops made by said belts and returning said endless belts by means of outer loops that constitute the external surface of the said mandrel,
maintaining said belt inner loops under tension up to the back end of said mandrel, thereby forcing the outer loops to separate from the pipe wall internal surface, at the mandrel end.
pushing the outer loops of the endless belts against their supporting and guiding means, by applying the first layer of the material being wound on said mandrel external surface,
and maintaining a spring load on both inner and outer loops of said belts at the back end of the said mandrel to compensate for belt slacking prior to the start of the strand winding step.

15. The method as claimed in claim 1 wherein the step of advancing the stations occurs on water.

16. A pipe fabricating apparatus comprising
means for moving the pipe fabricating apparatus forward, at the speed the pipe is being fabricated;
means for monitoring and supporting separate sections of the pipe fabricating apparatus on separate platforms, interconnected, articulated and propelled by a common power source;
means for continuously and uninterruptedly forming an articulated mandrel that extends from the first of said platforms to part of the last platform;
means for applying layers of plastic materials, reinforced with filaments, on said mandrel, to build a pipe wall;
means for constantly advancing the external surface of the mandrel automatically at the speed said layers of reinforced plastic materials are being applied onto the external surface of said mandrel, thereby preventing any relative longitudinal sliding motion between the materials being laid and the mandrel external surface;
means for hardening and strengthening said reinforced plastic materials, while said materials are supported by the mandrel;
means for vertically and laterally supporting, guiding and restraining the wall of the pipe being thus fabricated, and the mandrel therein, externally to the pipe wall and with no solid mechanical external contact being made with the pipe wall;
means for continuously and uninterruptedly extracting the mandrel external surface from inside the pipe wall and withdrawing its internal support means, as soon as the pipe wall has acquired the strength to support itself; and
means for leaving behind the forward moving pipe fabricating apparatus a completed pipe, ready to be laid in place, still with respect to the ground preinstalled means arranged to receive and hold said finished pipe.

17. A pipe fabricating apparatus according to claim 16 also including
- means for storing and dispensing the reinforced plastic materials in the form of resin pre-impregnated strands;
- means for helically winding said strands on the mandrel external surface and exerting a controlled and programmed amount of tension on the strands being wound on said mandrel;
- means for applying heat to the strand wound structure for curing the resin;
- means for applying pressure within the pipe wall structure on the heat softened resin at the beginning of the curing phase, said pressure resulting from the tension preset in the strands reinforcing filaments, thereby densifying the pipe wall structure by forcing resin into voids, cracks and spaces between filaments, thereby improving the bonding between adjacent fibers within the strands, other strands and layers of strands;
- means for controlling the resin curing process by regulating and coordinating the degree of heating and the time during which heat is being applied; and
- means for cooling the pipe wall after the resin curing process has reached the point at which enough strength is provided by the pipe wall structure to support itself after the cooling down phase is partly completed, the remaining resin curing being performed later at lower temperatures.

18. A pipe fabricating apparatus according to claim 17 further including
- means for winding said strands in successive layers to form the pipe wall thickness, all strands being wound at substantially the same angle automatically, with strands in any two adjacent layers being wound at inverse helix pitch angle, resulting in said strands, when wound, crisscrossing the wound strands forming both contiguous layers, located underneath and above it;
- means for accommodating a small amount of lateral sliding between the internal surface of the pipe wall being fabricated and the mandrel external surface, by introducing lubrication means at the interface between said two surfaces; and
- means for accommodating a small amount of pipe wall bending while the pipe wall structure is still flexible, to permit some angular motion between each adjacent platform section, thus allowing the pipe fabricating apparatus to follow the terrain contour and to lay the pipe along slightly curved paths.

19. A pipe fabricating apparatus according to claim 18 wherein the means for forming the external surface of the articulated mandrel comprises
- means for driving and supporting endless belts forming an outer loop that constitutes part of the mandrel external surface and an inner return loop that permits each and every part of the belt to come back to a position where it again becomes an outer loop;
- means for guiding both belt loops to prevent interference between the various loops of all belts, while providing for space inside the mandrel for the belt driving and supporting means, the mandrel section articulation means, the lubricating means and the power shaft required to actuate the belt driving means and its supporting structures;
- means for attaching and mounting the front end of the articulated mandrel to the front support structure affixed to the front end of the first platform;
- means for supplying power to the power shaft; and
- means for introducing a lubricating agent on the external surface of the outer belt loop.

20. A pipe fabricating apparatus according to claim 19 wherein the belts forming the external surface of the articulated mandrel overlap slightly, thereby constituting a closed surface, wherein each belt is laid parallel to the mandrel centerline and forms one complete loop, and wherein the outer loop of the belt is actuated from end to end, at intervals, along the mandrel full length.

21. A pipe fabricating apparatus according to claim 19 wherein the belts forming the external surface of the articulated mandrel are all separated by a gap, thereby forming an open surface, wherein each belt is laid parallel to the mandrel centerline and forms one complete loop, wherein the inner loop of the belt is actuated and pulled forward by means located at the front end of the mandrel and wherein the outer loop of that belt constitutes the outer loop that forms part of the external surface of the articulated mandrel.

22. A pipe fabricating apparatus according to claim 21 wherein the centerlines of the belts forming the mandrel external surface make a small angle with the mandrel centerline, thereby permitting the end of one inner return loop to become the beginning of the outer loop adjacent to the loop that just became the inner loop just mentioned, and thereby reducing the number of belts, with one being the extreme minimum possible number, resulting in one single belt forming all the inner and outer loops, with a total length approximately equal to twice the total length of the mandrel centerline times the number of outer loops.

23. A pipe fabricating apparatus according to claim 19 wherein the means for forming and actuating the mandrel external surface includes
- means for synchronizing and coordinating the longitudinal movement of the mandrel external surface with the first platform forward movement; and
- means for bridging the gaps and any unevenness between adjacent outer belt loops by applying a first layer of materials on the mandrel, formed by winding overlapping tapes to build up an impervious barrier that constitutes the internal protective layer of the completed pipe.

24. A pipe fabricating apparatus according to claim 23 wherein the strands are supplied, applied and wound in tape form.

25. A pipe fabricating apparatus according to claim 23 wherein the strands are supplied, applied and wound in filament form and substantially have a circular cross-section.

26. A pipe fabricating apparatus according to claim 23 wherein the nature of the materials constituting said strands can be varied and programmed to meet the pipe wall structural, thermal, mechanical and environmental protection requirements.

27. A pipe fabricating apparatus according to claim 23 wherein the strands storing and dispensing means comprises
- means for mounting the strands on spools supported by counterrotating carrousels mounted on a common revolving drum; and
- means for rotating all carrousels at the same rotational speed, half of them in one direction and the other half in the opposite direction, automatically and in a controlled manner, with any carrousel rotating in a direction opposite to that of the two contiguous and immediately adjacent carrousels, thereby causing the wound strands in any two pipe wall adjacent layers to follow the paths of two helices of reverse pitch but having the same absolute pitch angle.

28. A pipe fabricating apparatus according to claim 26 wherein the building up of the full pipe wall thickness comprises means for scheduling the order followed in the application of the materials according to their nature and intended function, within each layer;

means for scheduling the order followed in the application of the materials according to the function of the layer into which the materials are being introduced; and means for scheduling the order in which each layer is laid on top of the preceding layer.

29. A pipe fabricating apparatus according to claim 22 further including means for taking up and compensating for any slack in the outer loops of the belts, positioned at the back end of the articulated mandrel; and means for imparting a monitored, continuous and steady forward movement to the inner loops of the belts forming the mandrel external surface, located at the front end of the mandrel and inside the surface created by said inner loops.

30. A pipe fabricating apparatus according to claim 22 wherein the apparatus platforms supporting all fabrication means are installed and mounted on floating means, operating above water, and comprising means for monitoring and controlling the forward velocity of said floating means;

means for adjusting said forward velocity of the floating means to be constantly and steadily equal, but of opposite direction, to the velocity at which the completed pipe exits the pipe fabricating apparatus; and means for insuring that the completed pipe is still with respect to the ground under the water as it leaves the floating means and contacts the water.

31. A pipe fabricating apparatus according to claim 28 wherein pipe fabricating means is provided to construct a pipeline continuously on site and leave it in place, with non-metallic stuctural materials, starting with the raw construction materials themselves, said pipeline being built to transport energy containing fluids such as crude oil, natural gas, coal slurries and the like, over long distances, difficult terrains and under severe environmental pipeline construction and operating conditions.

* * * * *